(12) United States Patent
Utter

(10) Patent No.: US 12,206,755 B2
(45) Date of Patent: Jan. 21, 2025

(54) SYSTEM AND METHOD FOR TIMING RECOVERY IN HIGH BANDWIDTH COMMUNICATIONS

(71) Applicant: The Aerospace Corporation, El Segundo, CA (US)

(72) Inventor: Alexander Clifton Utter, Hawthorne, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 540 days.

(21) Appl. No.: 17/586,661

(22) Filed: Jan. 27, 2022

(65) Prior Publication Data

US 2024/0340156 A1 Oct. 10, 2024

(51) Int. Cl.
| | | |
|---|---|---|
| *H04L 27/14* | (2006.01) | |
| *H04L 7/00* | (2006.01) | |
| *H04L 7/02* | (2006.01) | |
| *H04L 27/16* | (2006.01) | |
| *H04L 27/22* | (2006.01) | |

(52) U.S. Cl.
CPC .............. *H04L 7/02* (2013.01); *H04L 7/0079* (2013.01)

(58) Field of Classification Search
CPC ...................... H04L 7/02; H04L 7/0079; H04L 25/03866; H04L 7/0331; H04L 7/027; H03L 7/0816; H04B 1/0014
USPC ................ 375/326, 327, 316, 371, 373, 376
See application file for complete search history.

(56) References Cited

U.S. PATENT DOCUMENTS

| | | | | |
|---|---|---|---|---|
| 5,388,127 | A | * | 2/1995 | Scarpa .................... H04L 7/027 375/376 |
| 5,946,355 | A | * | 8/1999 | Baker ............... H04L 25/03866 341/56 |
| 2009/0060104 | A1 | * | 3/2009 | Sher ...................... H04B 1/0014 375/345 |
| 2013/0113534 | A1 | * | 5/2013 | Wachi ................... H03L 7/0816 327/148 |
| 2019/0379524 | A1 | * | 12/2019 | Chan ..................... H04L 7/0331 |

OTHER PUBLICATIONS

Rao, et al., Proceedings of SPIE, "Electronics Design of a Multi-Rate DPSK Modem for Free-Space Optical Communications", SPIE LASE, 2014, San Francisco, CA, United States.
Spellmeyer, et al., "Sensitive Clock Recovery for Multi-Rate DPSK Optical Receivers", 2015 IEEE International Conference on Space Optical Systems and Applications (ICSOS).

* cited by examiner

*Primary Examiner* — Phuong Phu
(74) *Attorney, Agent, or Firm* — LeonardPatel PC

(57) ABSTRACT

Systems and methods for extracting and identifying timing information from wireless signals can include a signal receiver configured to receive a communications signal; a finite impulse response (FIR) filter coupled to the signal receiver and configured to identify a set of transitions in the communications signal; an absolute value operation module coupled to the FIR filter and configured to detect energy in each of the set of transitions within the communications signal; and a comb filter coupled to the absolute value operation module and configured to combine the detected energy in each of the set of transitions within the communications signal. Exemplary systems can also include a cyclic accumulator coupled to the comb filter and a signal processor.

19 Claims, 3 Drawing Sheets

S100 at a communication system, receiving a communications signal

S110 by the communication system, identifying a set of transitions in the communications signal

S120 by the communication system, detecting energy in each of the set of transitions within the communications signal

S130 by the communication system, combining the detected energy in each of the set of transitions within the communications signal

S140 by the communication system, accumulating the combined detected energy from the comb filter

S150 by the communication system, in response to accumulation of the combined detected energy, transmitting a communication signal identifier, a communication signal start time, and a communication signal end time to a signal processor

SYSTEM AND METHOD FOR TIMING RECOVERY IN HIGH BANDWIDTH COMMUNICATIONS

STATEMENT OF GOVERNMENT INTEREST

This invention was made with government support under Contract No. FA8802-19-C-0001 awarded by the Department of the Air Force. The government has certain rights in the invention.

FIELD

The present invention relates to signal retrieval and processing, and more particularly, to a system and method for timing recovery in high bandwidth communications.

BACKGROUND

In digital communications, clock and data recovery (CDR) is the process by which timing information is extracted from the received signal such that the receiver can decode the symbols in the received signals. With the adoption of higher bandwidths, lower duty-cycles, and bursty waveforms in wireless communications, the required hardware and software to perform CDR can force or foreclose a number of engineering and design choices. In particular, low-duty cycle burst waveforms are not reliably acquired by conventional CDR systems and methods. Moreover, conventional analog-to-digital converters (ADCs) can be configured to reliably perform CDR functions in high bandwidth (e.g., exceeding 500 MHz instantaneous bandwidth). However, the use of conventional ADCs comes with significant increases in cost, power consumption, and space/weight utilization.

Accordingly, an improved system and method for the identification and timing recovery of high bandwidth communications may be beneficial.

SUMMARY

Certain embodiments of the present invention may provide solutions to the problems and needs in the art that have not yet been fully identified, appreciated, or solved by current signal processing technologies. For example, some embodiments of an improved system and method for the identification and timing recovery of high bandwidth communications are cost-effective, power conserving, and consume little space and/or weight, thereby permitting implementation and execution of the embodiments on space vehicles or portable electronic devices.

In one embodiment, a system can include: a signal receiver configured to receive a communications signal and generate a discrete-time sampled communications signal; a finite impulse response filter coupled to the signal receiver and configured to identify a set of signal characteristics including one of simple transitions or fixed patterns in the discrete-time sampled communications signal; and an absolute value operation module coupled to the finite impulse response filter and configured to detect energy in each of the set of signal characteristics within the discrete-time sampled communications signal. The system can also include: a comb filter coupled to the absolute value operation module and configured to combine the detected energy in each of set of signal characteristics within the discrete-time sampled communications signal; a signal processor; and a maximum magnitude module configured to identify the time-index with the largest magnitude; and in response to accumulation of the combined detected energy, transmit a set of clock and data recovery (CDR) parameters to the signal processor.

In another embodiment, the maximum magnitude module can be coupled to the comb filter.

In another embodiment, the system can also include a cyclic accumulator coupled to the comb filter and the maximum magnitude module and configured to accumulate the combined detected energy from the comb filter over a set of time offsets.

In another embodiment, the input signal can be an analog or continuous-time communications signal.

In still other embodiments, the input signal can be received by or coupled to a one-bit analog to digital converter (ADC) to generate a discrete-time sampled communications signal.

In other embodiments, the input signal can be received by or coupled to a multi-bit ADC to generate the discrete-time sampled communications signal.

In another embodiment, a method can include: at a communication system, receiving a communications signal; by the communication system, identifying a set of signal characteristics comprising one of simple transitions or fixed patterns in the communications signal; and by the communication system, detecting energy in each of the set of signal characteristics within the communications signal. The method can also include: by the communication system, combining the detected energy in each of the set of signal characteristics within the communications signal; by the communication system, accumulating the combined detected energy from the comb filter; and by the communication system, in response to accumulation of the combined detected energy, transmitting a set of CDR parameters to a signal processor.

In another embodiment, the method can also include: by the system, accumulating the combined detected energy from the comb filter.

In another embodiment, the method can also include, by the system, in response to accumulation of the combined detected energy, transmitting CDR parameters regarding the communication signal (such as symbol-time, start time, and/or end time) to a signal processor.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 is a flow chart depicting a method for timing recovery in high bandwidth communications, in accordance with embodiments of the present invention;

DETAILED DESCRIPTION OF THE EMBODIMENTS

Generally, embodiments and example implementations of the apparatus, system, and method described herein can be used in terrestrial wired or wireless communications, and/or space-based wireless communications (e.g., satellite to satellite, satellite to ground, satellite to vehicle). One benefit of the apparatus, system, and method described herein is the significant reduction in size, weight, and cost of signal receiving materiel and components, which in turn permits users and designers greater latitude in the design and packaging of communications systems, particularly for space vehicles with restrictive size and weight requirements.

In digital communications, signals typically consist of a series of discrete symbols. Clock and data recovery (CDR) analyzes the received signal to identify CDR parameters such as the symbol rate, the optimal on-time sample marking the center of each received symbol, or the start time for a burst of consecutive symbols. Generally, data-aided CDR methods correlate against fixed sequences of symbols (such as preambles, midambles, or pilot sequences) inserted into the transmit signal specifically to aid this process; whereas blind CDR methods correlate against any transition between any two consecutive symbols; such transitions may occur randomly or by design.

For many signals, both blind and data-aided CDR methods result in correlations that are cyclostationary, meaning that the statistical expected value of the correlation varies periodically over time. This is true for both contiguous signals (where the transmitter is always sending symbols) or bursty signals (where the transmitter alternates between active and idle at a fixed interval). The cyclostationary period is linked to a variety of signal parameters, including the symbol rate, interval between preambles, and interval between bursts. The present invention comprises methods for accumulating and combining observed correlations over a long period of time. The present invention permits operation at very low signal to noise ratio (SNR), and permits operation using deeply nonlinear one-bit analog-to-digital converters.

1. SYSTEM AND METHOD

Figure 1:
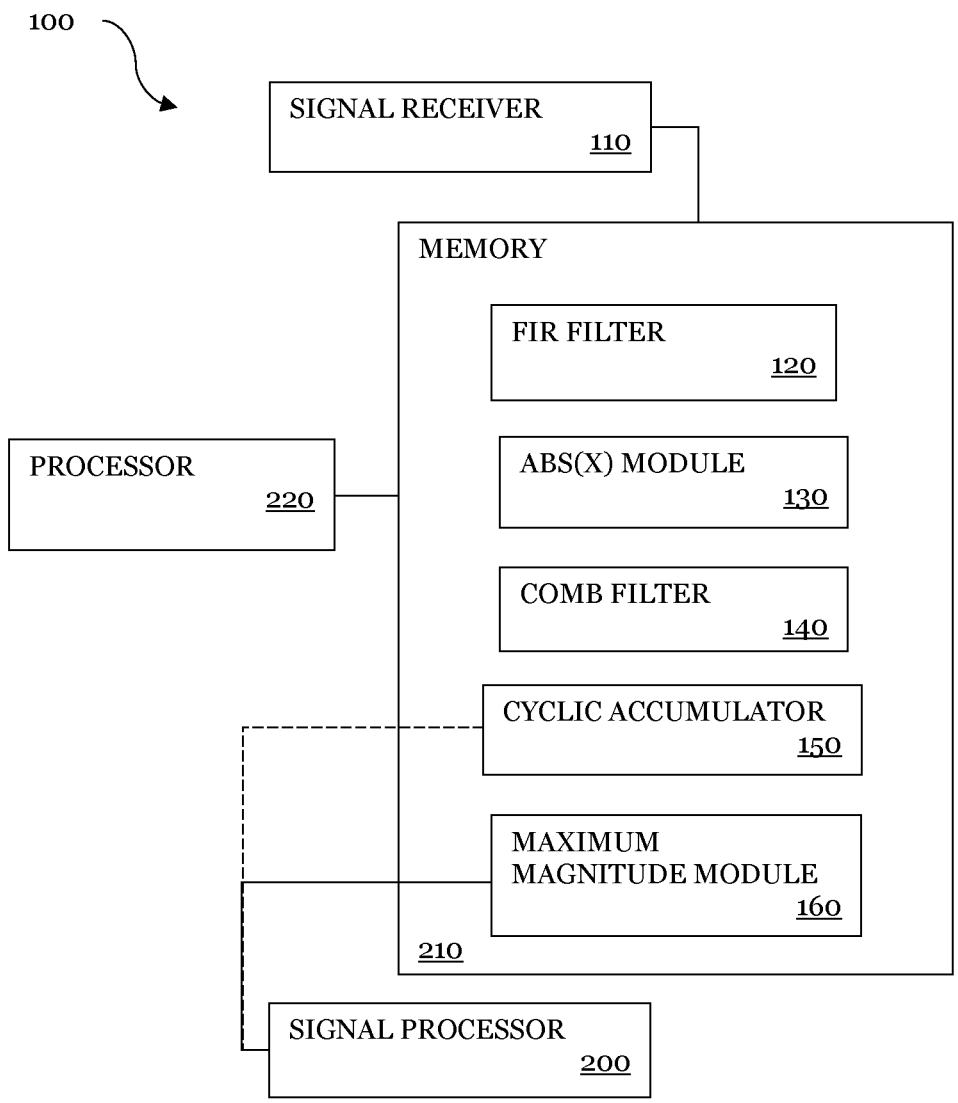
FIG. 1 is a schematic block diagram of an apparatus and/or system for timing recovery in high bandwidth communications, in accordance with embodiments of the present invention.

As shown in FIG. 1, a system 100 can generally be configured as or arranged as a communication system 100 or computational system 100 (hereinafter "system 100") including hardware, firmware, software, and/or one or more software modules.

As shown in FIG. 1, the system 100 can include: a signal receiver 110 configured to receive a discrete-time sampled communications signal; a finite impulse response (FIR) filter 120 coupled to the signal receiver 110 and configured to identify a set of transitions in the communications signal; and an absolute value operation module 130 coupled to the FIR filter 120 and configured to detect energy in each of the set of transitions within the communications signal. As shown, the system 100 can also include: a comb filter 140 coupled to the absolute value operation module 130 and configured to combine the detected energy in each of the set of transitions within the communications signal; and a cyclic accumulator 150 coupled to the comb filter and a signal processor 200. As described in more detail below, the cyclic accumulator 150 can be configured to: accumulate the combined detected energy from the comb filter 140; and in response to accumulation of the combined detected energy, transmit CDR parameters to the signal processor 200. In some variations of the example embodiment, the signal 110 may be generated by a one-bit analog to digital converter (ADC).

As shown in FIG. 1, the system 100 can include a signal receiver 110 to receive a wired or wireless communications signal. Generally, the signal receiver 110 can include a detector configured to receive incident energy and convert the received energy into an electrical signal. Non-limiting examples of the signal receiver 110 can include an antenna, amplifier, photodiode, or any suitable combination thereof. For example, a signal receiver 110 can include two or more antennas arranged in a fixed or variable array to provide high bandwidth capture of inbound signals across a range of frequencies. The signal receiver 110 can also include a casing to protect the signal receiver 110 from environmental hazards (terrestrial or orbital), maintain temperature control within the signal receiver 110 and its associated electronics, and/or permit the signal receiver 110 to be placed and/or arranged on an outboard surface of a terrestrial vehicle or space vehicle.

As shown in FIG. 1, the system 100 can include FIR filter 120 coupled to the signal receiver 110 and configured to identify a set of transitions in the communications signal. Generally, the FIR filter 120 functions to emphasize sharp data transitions in the communications signal. In one example implementation, the FIR filter 120 can be configured as a software module and/or as machine executable software residing on the system 100. Alternatively, the FIR filter 120 can be configured as a hardware/firmware module integrated with or connectable to the system 100 and to the signal receiver 110. In some embodiments, the system 100 can also include a signal conditioner or other preparatory phase, filter, or module to arrange or organize the inbound signal from the signal receiver 110 to the FIR filter 120. In other embodiments, the FIR filter 120 can be in direct electrical or electromagnetic communication with the signal receiver 110.

In some embodiments, the FIR filter is configured to match the expected pulse shape of two consecutive opposite-valued symbols in the discrete-time sampled communications signal. For example, when receiving a discrete-time sampled communications signal with rectangular binary phase-shift keyed (BPSK) pulses lasting four discrete-time samples, the FIR filter coefficients may be [−1, −1, −1, −1, +1, +1, +1, +1]. In other embodiments, the FIR filter may be configured to match fixed patterns such as preambles, midambles, or pilot sequences that may be present in the discrete-time sampled communications signal.

As shown in FIG. 1, the system 100 can further include an absolute value operation module 130 coupled to the FIR filter 120 and configured to detect energy in each of the set of transitions within the communications signal. The absolute value operation module 130 can function to receive the filtered signal from the FIR filter 120, indicative of sharp data transitions in the communications signal, and normalize, rectify, classify, and/or arrange the sharp data transitions as detected energy in the communications signal. In one example implementation, the absolute value operation module 130 can be configured as a software module and/or as machine executable software residing on the system 100. Alternatively, the absolute value operation module 130 can be configured as a hardware/firmware module integrated with or connectable to the system 100 and to the FIR filter 120.

As shown in FIG. 1, the system 100 can also include a comb filter 140 coupled to the absolute value operation module 130 and configured to combine the detected energy in each of the set of transitions within the communications signal. Generally, the comb filter 140 can function to combine the detected energy output from the absolute value operation module 130 within a selected burst or transmission of the communications signal. For example, the comb filter 140 can overlay or combine delayed copies of an input signal from the absolute value operation module 130 to effectively boost, augment, filter and/or clean the communication signal through constructive and destructive interference in the pattern of the input signal from the absolute value operation module 130. In one example implementation, the comb filter 140 can be configured as a software module and/or as machine executable software residing on the system 100. Alternatively, the comb filter 140 can be configured as a hardware/firmware module integrated with or connectable to the system 100 and to the absolute value operation module 130.

In some embodiments, the comb filter 140 may be configured to match the symbol rate of the discrete-time sampled communications signal. For example, when receiving a discrete-time sampled communications signal with rectangular pulses lasting four discrete-time samples, the comb filter 140 coefficients may be [+1, 0, 0, 0, +1, 0, 0, 0, +1, 0, 0, 0, . . . ]. In embodiments for bursty communications signals, the number of nonzero coefficients may be linked to the number of symbols in each burst. In other embodiments, the number of nonzero coefficients may be linked to the desired integration time.

As shown in FIG. 1, the system 100 can include a cyclic accumulator 150 coupled to the comb filter 140. Generally, the cyclic accumulator 150 can function to periodically or cyclically combine sequential outputs from the comb filter 140 throughout a set of consecutive bursts in the communication signal. The cyclic accumulator 150 can include a plurality of accumulators operating at different discrete time offsets. The number of required time offsets can be equal to the cyclostationary period of the output from the comb filter. For bursty communication signals, this period corresponds to the burst-to-burst interval.

In one example implementation, the cyclic accumulator 150 can be configured as a software module and/or as machine executable software residing on the system 100. Alternatively, the cyclic accumulator 150 can be configured as a hardware/firmware module integrated with or connectable to the system 100 and to the comb filter 140. In another example implementation, the cyclic accumulator 150 can be configured to operate only in digital logic, resulting in significant savings in weight, power consumption, and design complexity for the system 100.

Generally, the cyclic accumulator 150 is configured to calculate the cyclostationary sum or average of the output from the comb filter 140. For example, when receiving a discrete-time sampled communications signal with a fixed burst-to-burst interval of N samples, and the desired integration time spans a total of B such bursts, the cyclic accumulator 150 may be configured such that:

$$y_{[t]} = \sum_{k=1}^{B} x_{[t+kN]}$$

In some embodiments, the output of the comb filter 140 or cyclic accumulator 150 is coupled to a maximum magnitude module 160 that tracks the maximum observed magnitude over a designated interval, and outputs the time-index of the maximum sample. This time-index indicates the precise time-alignment of the original signal. (e.g., the start time of a bursty signal, or the symbol transition time of a contiguous signal.)

As shown in FIG. 1, the system 100 can include a maximum magnitude 160 coupled to a signal processor 200 and to either the comb filter 140 or the cyclic accumulator 150. In response to accumulation of the combined detected energy over a designated interval, the maximum magnitude 160 can transmit the time-index of the sample with the largest magnitude to the signal processor 200. This time-index indicates communication signal start time, which can be communicated to the signal processor 200 to perform CDR and decode the received signal.

In one variation of the example embodiment, the signal receiver 110 can include a one-bit analog to digital converter (ADC). Unlike classical CDR systems, the present invention can overcome the deep nonlinearity of a one-bit ADCs. In addition, the present invention can accumulate combined detected energy over very long intervals, which allows acquisition of low duty-cycle bursty waveforms with a substantially low signal-to-noise ratio (SNR). Moreover, the system 100 can include a one bit ADC in the signal receiver 110 while acquiring and/or receiving high bandwidth or ultrahigh bandwidth signals. For example, the system 100 can be configured to acquire or receive communication signals including signal bandwidths exceeding 2 GHz. Alternatively, the system 100 can be configured to acquire or receive communication signals associated with various industry, commercial, or other spectral allocations or industry standards, including for example fifth generation (5G) wireless, sixth generation (6G) wireless, etcetera. In some embodiments, the discrete-time sampled communications signal may be real- or complex-valued. In some embodiments, the discrete-time sampled communications signal may be corrupted by significant amounts of noise, and may even contain more noise power than signal power.

As shown in FIG. 1, the system 100 can include and one or more processor(s) 220 coupled a memory 210 for processing information. The processor(s) 220 can be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. The processor(s) 220 can also have multiple processing cores, and at least some of the cores can be configured to perform specific functions. Multi-parallel processing can be used in some embodiments. In certain embodiments, at least one of the processor(s) 220 can be a neuromorphic circuit that includes processing elements that mimic biological neurons. In some embodiments, neuromorphic circuits might not require the typical components of a Von Neumann computing architecture.

As shown in FIG. 1, the system 100 can also include a memory 210 for storing information and instructions to be executed by the processor(s) 220. The memory 210 can include of any combination of Random Access Memory (RAM), Read Only Memory (ROM), flash memory, cache, static storage such as a magnetic or optical disk, or any other types of non-transitory computer-readable media or combinations thereof. Non-transitory computer-readable media can be any available media that can be accessed by the processor(s) 220 and can include volatile media, non-volatile media, or both. The media can also be removable, non-removable, or both.

For example, the memory 210 can store information and/or instructions relating to the performance of one or more modules, functions, and/or subsystems within the system 100, including: the FIR filter 120, the absolute value operation module 130, the comb filter 140, and/or the cycling accumulator 150.

It should be noted that some of the system 100 features described in this specification have been presented as modules and/or subsystems, in order to emphasize their implementation independence more particularly. For example, a module can be implemented as a hardware circuit comprising custom very large scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices, graphics processing units, or the like.

A module can also be at least partially implemented in software for execution by various types of processors 220. An identified unit of executable code can, for instance, include one or more physical or logical blocks of computer instructions that can, for instance, be organized as an object, procedure, or function. Nevertheless, the executables of an identified module need not be physically located together, but can include disparate instructions stored in different locations that, when joined logically together, comprise the module and achieve the stated purpose for the module. Further, modules can be stored on a computer-readable medium, which can be, for instance, a hard disk drive, flash device, RAM, tape, and/or any other such non-transitory computer-readable medium used to store data without deviating from the scope of the invention.

Indeed, a module of executable code could be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network.

The process steps executed by the system 100 can be performed by a computer program, encoding instructions for the processor(s) to perform at least part of the process(es), techniques, or methods described herein, in accordance with embodiments of the claimed invention. The computer program can be embodied on a non-transitory computer-readable medium. The computer-readable medium can be, but is not limited to, a hard disk drive, a flash device, RAM, a tape, and/or any other such medium or combination of media used to store data. The computer program can include encoded instructions for controlling the processor(s) of a computer system (e.g., the processor(s) 220 of the system 100 of FIG. 1) to implement all or part of the process steps described in herein, which can also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

Additionally, the system 100 can also be configured to execute a method S100 for receiving and/or acquiring wired or wireless signals. As shown in FIG. 2, the method S100 can include: at a communication system (system 100), receiving a communications signal in block S110; by the system, identifying a set of transitions in the communications signal in block S120; and by the system, detecting energy in each of the set of transitions within the communications signal in block S130. The method S100 can also include: by the system, combining the detected energy in each of the set of transitions within the communications signal in block S140; by the system, accumulating the combined detected energy from the comb filter in block S150; and by the system, in response to accumulation of the combined detected energy, transmitting CDR parameters to a signal processor in block S160.

In one alternative embodiment, the signal receiver 110 can include an antenna or a set of antennas to receive an inbound radio frequency communications signal. The antenna or set of antennas can function to receive and/or resonate with inbound electromagnetic communications within the bandwidth of the antenna or set of antennas. Alternatively, the antenna or set of antennas can be arranged in an array, in a plane, along one or more leading edges of a terrestrial vehicle or space vehicle, and/or within a protective housing or casing to prevent damage to the antenna or set of antennas during transit and/or use.

As shown in FIG. 2, the method S100 can include: by the system 100, identifying a set of transitions in the communications signal in block S120. In one example embodiment, the system 100 can execute block S110 of the method S100 with a FIR filter that functions to emphasize sharp data transitions in the communications signal, which may be indicative of a start/stop in the data transmission. In one example implementation, the FIR filter can be configured as a software module and/or as machine executable software residing on the system 100. Alternatively, the FIR filter can be configured as a hardware/firmware module integrated with or connectable to the system 100 and to the signal receiver 110.

As shown in FIG. 2, the method S100 can include: by the system 100, detecting energy in each of the set of transitions within the communications signal in block S130. In one example embodiment, the system 100 can execute block S130 of the method S100 with an absolute value operator module that can function to receive the filtered signal from the FIR filter, indicative of sharp data transitions in the communications signal, and normalize, rectify, classify, and/or arrange the sharp data transitions as detected energy in the communications signal. In one example implementation, the absolute value operation module can be configured as a software module and/or as machine executable software residing on the system 100. Alternatively, the absolute value operation module can be configured as a hardware/firmware module integrated with or connectable to the system 100 and to the FIR filter.

As shown in FIG. 2, the method S100 can include: by the communication system, combining the detected energy in each of the set of transitions within the communications signal in block S140. In one example embodiment, the system 100 can execute block S140 of the method S100 with a comb filter that functions to combine the detected energy output from the absolute value operation module within a selected burst or transmission of the communications signal. For example, the comb filter can delay an input signal from the absolute value operation module and overlay or combine the delayed input signal with an original input signal from the absolute value operation module to effectively boost, augment, filter and/or clean the communication signal through constructive and destructive interference in the pattern of the input signal from the absolute value operation module. In one example implementation, the comb filter can be configured as a software module and/or as machine executable software residing on the system 100. Alternatively, the comb filter can be configured as a hardware/firmware module integrated with or connectable to the system 100 and to the absolute value operation module.

As shown in FIG. 2, the method S100 can include: by the communication system, accumulating the combined detected energy from the comb filter in block S150; and by the communication system, in response to accumulation of the combined detected energy, transmitting CDR parameters to a signal processor in block S160. In one example embodiment, the system 100 can execute blocks S150 and S160 of the method S100 a cyclic accumulator that can function to periodically or cyclically combine sequential outputs from the comb filter throughout a set of consecutive bursts in the communication signal. In one example implementation of the method S100, the cyclic accumulator can be configured as a software module and/or as machine executable software residing on the system 100. Alternatively, the cyclic accumulator can be configured as a hardware/firmware module integrated with or connectable to the system 100 and to the comb filter. In another example implementation of the method S100, the cyclic accumulator can be configured to operate only in digital logic, resulting in significant savings in weight, power consumption, and design complexity for the system 100 that executes the method S100.

As noted above, in one alternative embodiment, in executing the method S100, the system 100 can include a signal receiver that includes a one-bit ADC. Accordingly, in executing the method S100, the system 100 can overcome the deep nonlinearity of a one-bit ADCs and acquire low duty-cycle bursty waveforms with a substantially low signal-to-noise ratio (SNR). Moreover, the system 100 can include a one bit ADC in acquiring and/or receiving high bandwidth or ultrahigh bandwidth signals in accordance with one or more embodiments of the method S100. For example, in executing one or more embodiments of the method S100, the system 100 can be configured to acquire or receive wired or wireless signals with a bandwidth exceeding 2 GHz. Alternatively, the system 100 execute embodiments of the method S100 to acquire or receive wired or wireless signals associated with various industry, commercial, or other spectral allocations or industry standards, including for example fifth generation (5G) wireless, sixth generation (6G) wireless, etcetera.

2. EXAMPLES

Figure 3:
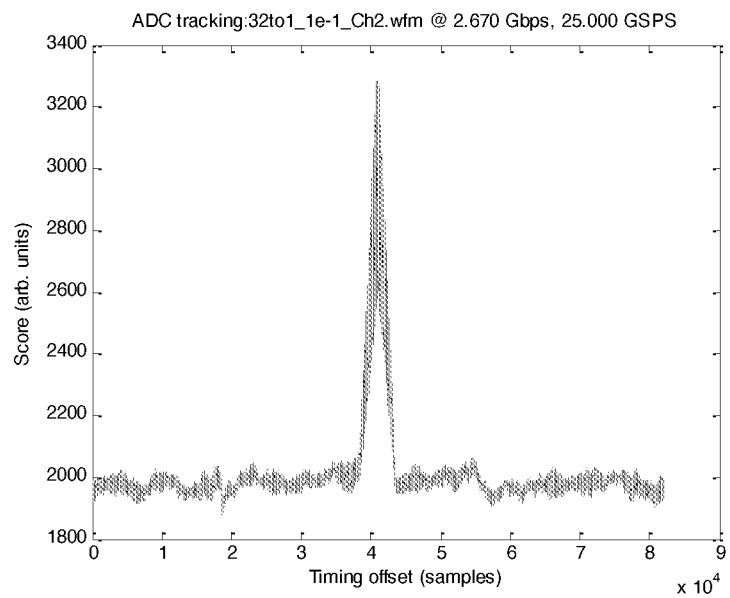
FIG. 3 is a graphical depiction of a timing recovery signal in accordance with an example implementation of the present invention.
Figure 4:
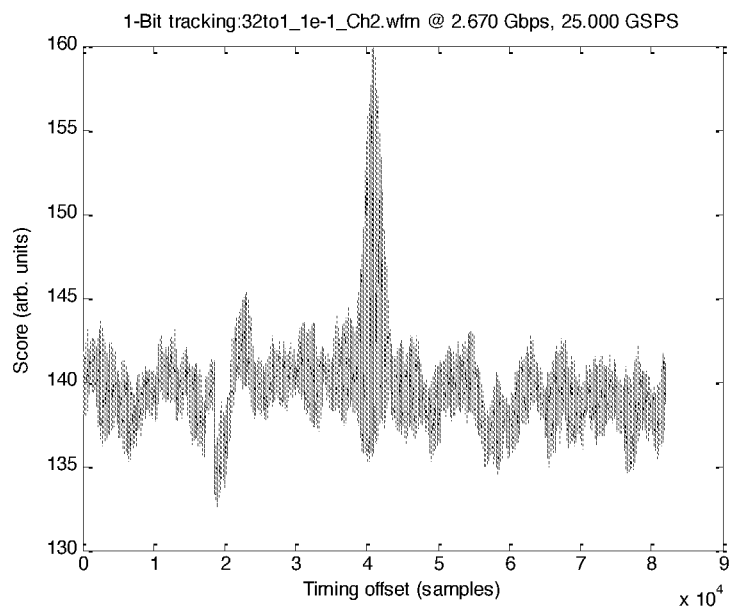
FIG. 4 is a graphical depiction of a timing recovery signal in accordance with another example implementation of the present invention.

As shown in FIGS. 3 and 4, an example implementation of embodiments of the system 100 executing embodiments of the method S100 can perform clock and data recovery on a simulated communication signal. As shown in FIGS. 3 and 4, the peaks in each of the graphs represent the on-time sample that starts the burst within the communication signal. FIG. 3 is illustrative of a linear mode (8-bits per sample) configuration operating at 2.67 Gbaud (2.67 billion bits/second) and at 25 giga samples per second (GSPS). FIG. 4 is illustrative of a serializer/deserializer (SERDES) mode (1-bit per sample) configuration also operating at 2.67 Gbaud and at 25 GSPS.

As shown in FIGS. 3 and 4, example embodiments of the system 100 can execute example embodiments of the method S100 to acquire, receiver, and/or extract timing and signal data from a high or ultrahigh bandwidth inbound communication signal. In the example embodiments described above, the example system 100 consumed approximately 1 W of power as a 2.5 Gbaud, which is significant power savings over the 10+W power consumption of more typical signal receiver designs.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An apparatus comprising:
a signal receiver configured to receive a communications signal and generate a discrete-time sampled communications signal;
a finite impulse response filter coupled to the signal receiver and configured to identify a set of signal characteristics comprising one of simple transitions or fixed patterns in the discrete-time sampled communications signal;
an absolute value operation module coupled to the finite impulse response filter and configured to detect energy in each of the set of signal characteristics within the discrete-time sampled communications signal;
a comb filter coupled to the absolute value operation module and configured to combine the detected energy in each of set of signal characteristics within the discrete-time sampled communications signal;
a signal processor; and
a maximum magnitude module configured to:
identify the time-index with the largest magnitude of the combined detected energy; and
in response to accumulation of the combined detected energy, transmit a set of clock and data recovery (CDR) parameters to the signal processor.

2. The apparatus of claim 1, wherein the maximum magnitude module is coupled to the comb filter.

3. The apparatus of claim 1, further comprising:
a cyclic accumulator coupled to the comb filter and the maximum magnitude module and configured to accumulate the combined detected energy from the comb filter over a set of time offsets.

4. The apparatus of claim 1, wherein the signal receiver comprises a one-bit analog to digital converter (ADC).

5. The apparatus of claim 2, wherein the signal receiver comprises a one-bit analog to digital converter (ADC).

6. The apparatus of claim 3, wherein the signal receiver comprises a one-bit analog to digital converter (ADC).

7. The apparatus of claim 1, wherein the signal receiver comprises an antenna and the communication signal comprises a radio frequency signal.

8. The apparatus of claim 2, wherein the signal receiver comprises an antenna and the communication signal comprises a radio frequency signal.

9. The apparatus of claim 3, wherein the signal receiver comprises an antenna and the communication signal comprises a radio frequency signal.

10. The apparatus of claim 4, wherein the signal receiver comprises an antenna and the communication signal comprises a radio frequency signal.

11. The apparatus of claim 5, wherein the signal receiver comprises an antenna and the communication signal comprises a radio frequency signal.

12. The apparatus of claim 6, wherein the signal receiver comprises an antenna and the communication signal comprises a radio frequency signal.

13. A method comprising:
at a communication system, receiving a communications signal;
by the communication system, identifying a set of signal characteristics comprising one of simple transitions or fixed patterns in the communications signal;
by the communication system, detecting energy in each of the set of signal characteristics within the communications signal;
by the communication system, combining the detected energy in each of the set of signal characteristics within the communications signal via using a comb filter;
by the communication system:
accumulating the combined detected energy from the comb filter; and
in response to accumulation of the combined detected energy, transmitting a set of CDR parameters to a signal processor.

14. The method of claim 13, wherein the communication system comprises a one-bit analog to digital converter (ADC).

15. The method of claim 13, further comprising, by the communication system:
identifying the time-index with the largest magnitude.

16. The method of claim 13, wherein the signal receiver comprises an antenna and the communication signal comprises a radio frequency signal.

17. The method of claim 14, wherein the signal receiver comprises an antenna and the communication signal comprises a radio frequency signal.

18. The method of claim 15, wherein the signal receiver comprises an antenna and the communication signal comprises a radio frequency signal.

19. The method of claim 13, further comprising:
in response to receiving the communications signal, generating a discrete-time sampled communications signal.

* * * * *